(12) United States Patent
Cannaverde (10) Patent No.: US 8,695,680 B2
(45) Date of Patent: Apr. 15, 2014

(54) DISABLING DEVICE FOR WINDOW TREATMENT

(75) Inventor: Joseph Cannaverde, Stamford, CT (US)

(73) Assignee: Rollease, Inc., Stamford, CT (US)

( * ) Notice: Subject to any disclaimer, the term of this patent is extended or adjusted under 35 U.S.C. 154(b) by 48 days.

(21) Appl. No.: 13/330,855

(22) Filed: Dec. 20, 2011

(65) Prior Publication Data

US 2012/0160630 A1    Jun. 28, 2012

Related U.S. Application Data (60) Provisional application No. 61/426,560, filed on Dec. 23, 2010, provisional application No. 61/426,564, filed on Dec. 23, 2010.

(51) Int. Cl.
     *E06B 9/56*      (2006.01)

(52) U.S. Cl.
     USPC .......................................... 160/321; 160/307

(58) Field of Classification Search
     USPC .............. 160/321, 304.1, 303, 322, 298, 307, 160/308; 474/136, 139
See application file for complete search history.

(56) References Cited

U.S. PATENT DOCUMENTS

| | | | |
|---|---|---|---|
| 120,971 A * | 11/1871 | Hoffmeister, Jr. ............. | 160/298 |
| 521,408 A * | 6/1894 | Goldmann ..................... | 160/307 |
| 1,351,403 A | 8/1920 | Sager | |
| 1,437,851 A | 12/1922 | Lange | |
| 1,535,591 A | 11/1923 | Ferrara | |
| 1,499,340 A | 7/1924 | Bundy, Jr. | |
| 1,606,986 A | 11/1926 | Clark | |
| 2,013,500 A | 9/1935 | O'Connor | |
| 2,094,540 A | 9/1937 | Kirchen | |
| 2,198,088 A | 4/1940 | Peckham | |
| 2,341,217 A | 2/1944 | Holtzclaw | |
| 2,463,110 A | 3/1949 | Johnson | |
| 2,480,438 A | 8/1949 | Bergman et al. | |
| 2,651,489 A | 9/1953 | Bell | |
| 3,102,584 A * | 9/1963 | Znamirowski ................ | 160/300 |
| 3,123,182 A * | 3/1964 | Malone et al. ............... | 188/65.1 |
| 3,730,469 A | 5/1973 | Shields | |
| 4,120,474 A | 10/1978 | Hurley | |
| 4,179,091 A | 12/1979 | Bidney | |
| 4,751,953 A | 6/1988 | Appel et al. | |
| 5,009,259 A | 4/1991 | Miloslaus | |
| D364,984 S | 12/1995 | Voss | |
| D377,287 S | 1/1997 | Biba | |
| D395,973 S | 7/1998 | Huang | |

(Continued)

FOREIGN PATENT DOCUMENTS

| AU | 200189239 A1 | 5/2002 |
|---|---|---|
| DE | 4227425 A1 | 3/1994 |

(Continued)

*Primary Examiner* — Blair M. Johnson
(74) *Attorney, Agent, or Firm* — Gottlieb, Rackman & Reisman, P.C.

(57) ABSTRACT

A device for disabling a window treatment operated by a cord includes at least one member with a gear engaging the cord. When the cord is not tensioned correctly, the gear of the member intermeshes with teeth on another member impeding movement of the cord along its length. In one embodiment, two gears engage different sections of the cord and intermesh with each other. In another embodiment, a stationary member intermeshes with the gear of member selectively pivoted by the cord in accordance with the tension on the cord.

14 Claims, 5 Drawing Sheets

(56) References Cited

U.S. PATENT DOCUMENTS

| | | | |
|---|---|---|---|
| D428,292 S | 7/2000 | Anderson | |
| 6,135,403 A | 10/2000 | Goldstein | |
| 6,196,508 B1 | 3/2001 | Nijs | |
| D440,104 S | 4/2001 | Horsten | |
| D442,413 S | 5/2001 | Ishii | |
| D448,595 S | 10/2001 | Chico | |
| 6,749,000 B2 * | 6/2004 | Bohlen | 160/321 |
| 7,051,782 B2 | 5/2006 | Nochols et al. | |
| 7,114,544 B2 | 10/2006 | Rice et al. | |
| D533,004 S | 12/2006 | Dekker et al. | |
| D541,568 S | 5/2007 | Metaxatos | |
| 7,451,956 B2 | 11/2008 | Bohlelln | |
| D591,993 S | 5/2009 | Chou | |
| D596,435 S | 7/2009 | Wills | |
| D620,738 S | 8/2010 | Baron | |
| D637,856 S | 5/2011 | Labarre et al. | |
| D647,342 S | 10/2011 | Cannaverde et al. | |
| 2002/0189771 A1 | 12/2002 | Colson et al. | |
| 2004/0226663 A1 | 11/2004 | Smith et al. | |
| 2005/0183835 A1 | 8/2005 | Nien | |
| 2006/0272782 A1 | 12/2006 | Nichols et al. | |
| 2007/0253768 A1 | 11/2007 | Li et al. | |
| 2008/0067278 A1 | 3/2008 | Fortunato et al. | |
| 2008/0142171 A1 | 6/2008 | Koop et al. | |
| 2011/0061817 A1 | 3/2011 | Smith | |
| 2012/0160630 A1 * | 6/2012 | Cannaverde | 192/71 |

FOREIGN PATENT DOCUMENTS

| | | |
|---|---|---|
| DE | 19546203 A1 | 3/1997 |
| EP | 0863290 A1 | 9/1998 |
| EP | 1643077 A2 | 4/2006 |
| WO | 2006/042377 A1 | 4/2006 |
| WO | 2008025494 A1 | 3/2008 |
| WO | 2008094720 A1 | 8/2008 |

* cited by examiner

DISABLING DEVICE FOR WINDOW TREATMENT

RELATED APPLICATIONS

This application claims priority to U.S. provisional application Ser. No. 61/426,560 and 61/426,564 filed on Dec. 23, 2011 and to U.S. Design Pat. D647,342 based on U.S. application Ser. No. 29/381,573 filed on Dec. 21, 2010, all incorporated herein in their entirety.

BACKGROUND OF THE INVENTION

A. Field of Invention

This invention pertains to a window treatment operated by a cord, wherein a disabling device is provided to disable the window treatment if the cord is not tensioned properly. The device includes one or more gears engaged by the cord and blocked from rotation when the cord is not tensioned properly.

B. Description of the Prior Art

In the present application the term 'window treatment' refers to an apparatus for selectively covering a door, a window or other architectural feature in a building. Typical window treatments include window shades or blinds, venetian blinds, roman shades, vertical blinds, pleated blinds, and so. Window treatments can be operated either manually, using one or more cord, or automatically using an electric motor to activate the shade and a remote controller coupled to the electric motor either via a wired or wireless connection. The remote controller may respond to commands from a user or may operate autonomously. However, automatic window treatments are very expensive and complex, and by and large, the majority of window treatments are operated manually. Most of these latter types of window treatment include a built-in control mechanism that is used to operate the window treatment, e.g., raise or lower a fabric sheet, a plurality of slats, etc., with an elongated member such as a cord engaging the control mechanism. For example, the control mechanism may be a clutch such as one manufactured by Rollease, Inc. of Stamford, Conn.

It has been found that it is advantageous to tension the cord after the window treatment has been installed, and to disable the control mechanism and immobilize the cord if the free portion of the cord is not tensioned properly, but it is left loose adjacent to the window treatment. Mechanisms for disabling window treatment control mechanisms have been previously proposed, however, they were not found to be convenient to make and are not always effective.

SUMMARY OF THE INVENTION

A device for disabling a window treatment operated by a cord includes at least one member with a gear engaging the cord. When the cord is not tensioned correctly, the gear of the member intermeshes with teeth on another member impeding movement of the cord along its length. In one embodiment two gears engage different sections of the cord and intermesh with each other. In another embodiment, a stationary member intermeshes with the gear of member selectively pivoted by the cord in accordance with the tension on the cord. More particularly, in one embodiment, a device for disabling a window treatment including a control mechanism operated by a cord movable in a longitudinal direction along its length, includes a first member having a cord engaging element, said first member rotating about an axis, said cord engaging member engaging said cord to transfer a motion of said cord along said longitudinal direction into a rotation of said first member, said first member moving laterally with respect to said longitudinal direction between a first and a second position in response to tension on said cord; and a second member;

said first member and said second member cooperating to block movement of said cord in the longitudinally direction when said first member is in said first position.

DETAILED DESCRIPTION OF THE INVENTION

Figure 1:
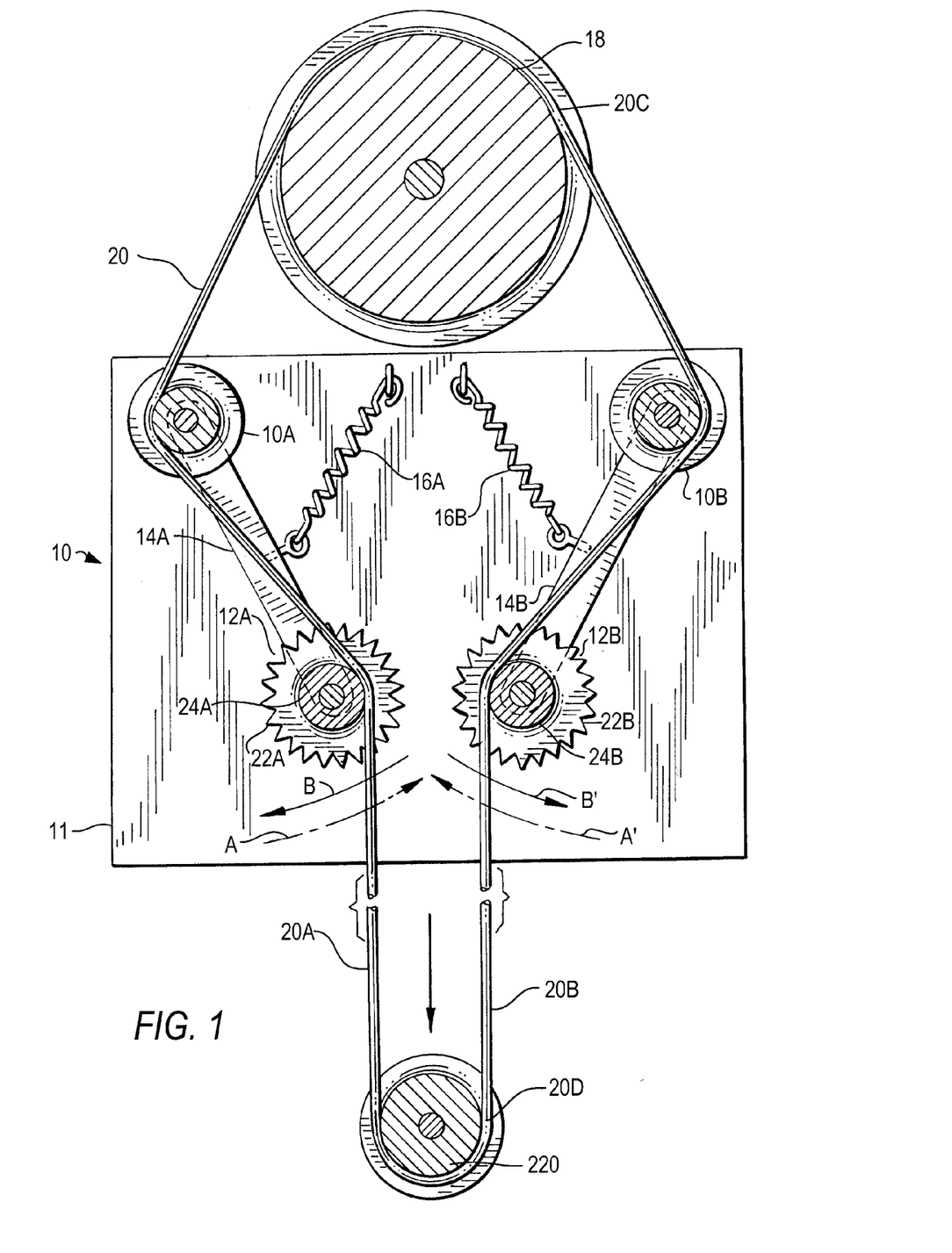
FIG. 1 shows a somewhat diagrammatic front view of a device for disabling a window treatment constructed in accordance with this invention using two gears.

A device for disabling a window treatment constructed in accordance with this invention is shown in FIG. 1. In this Figure the device 10 includes two stationary gears 10A, 10B, mounted on a base 11 and two pivoting gears 12A and 12B. Each gear 12A, 12B is mounted on a first end of a respective rod 14A, 14B.

In the embodiment shown, the other ends of rods 14A, 14B are mounted coaxially with pulleys 10A, 10B. In another embodiment (not shown), the other ends of rods 14A, 14B are secured to base 11 at a location space at a predetermined distance from the gears 12A, 12B.

The device 10 further includes two biasing springs 16A, 16B. Each spring 16A, 16B includes a first end attached to the base 11 and a second end attached to the respect rod 14A, 14B as shown in FIG. 1. The two springs 16A, 16B are tensioned to cause the two arms 14A, 14B to pivot toward each other in directions A, A'.

Each 12A, 12B gear has a respective large diameter toothed wheel 22A, 22B with a plurality of radial teeth 23; and a respective smaller diameter pulley 24A, 24B. Each pulley is attached to the respective gear and they are rotationally interlocked so that they can rotate round a common axis. In the figures, teeth 23 are shown with a triangular cross-section, however, they could also have rectangular, square, trapezoidal or other shapes as well.

Figure 2:
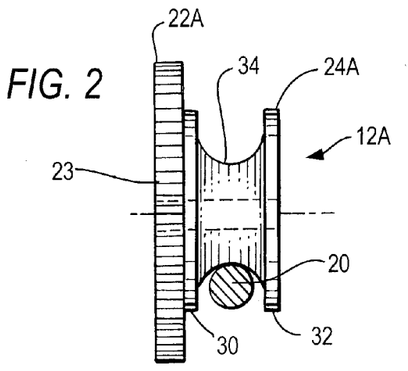
FIG. 2 shows a cross-sectional view of a first embodiment of a pulley for the device of FIG. 1.

FIG. 2 shows a cross sectional view of one embodiment of the pulleys 10A, 10B, 24A, 24B. Pulleys 10A, 10B can but need not have the same dimensions as pulleys 24A, 24B. In this embodiment, each pulley includes two radial rims 30, 32 and central surface 34 having a toroidal cross-section as shown. The two rims 30, 32 can be the same size, or one of them may have a larger diameter then the other. The rims 30, 32 are spaced from each other sufficiently to receive a cord 20 therebetween. The surface 34 has about the same or a slightly smaller cross-sectional radius of curvature as the radius of cord 20. In an alternate embodiment, surface 34 is cylindrical.

The cord 20 can be a rope, a single or multifilament thread, a wire, a twine, a chain or can be formed of a plurality of beads that are either interconnected directly to each other, or are mounted on a common thread 21.

Figure 3:
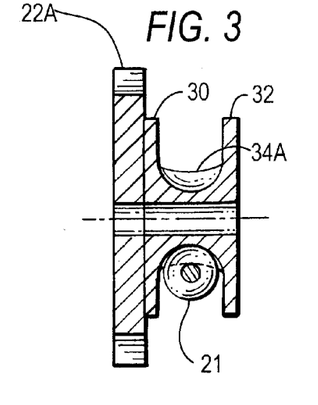
FIG. 3 shows a side view of the second embodiment of the pulley.
Figure 4:
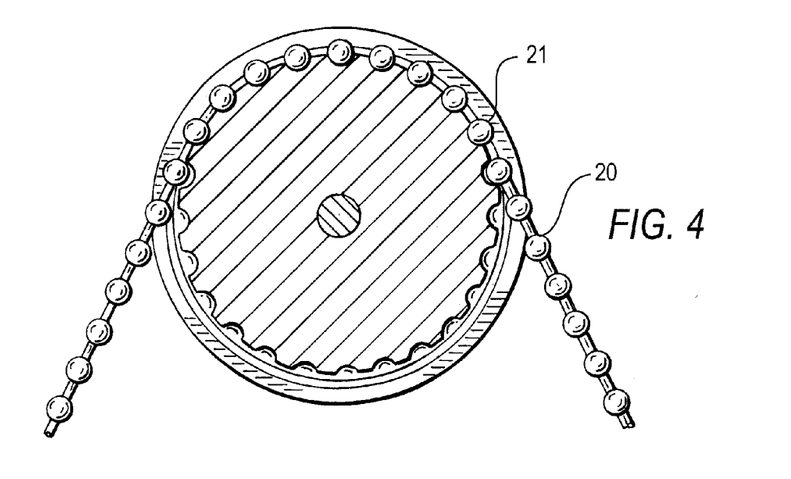
FIG. 4 shows a front view of a third embodiment of a pulley for the device of FIG. 1.
Figure 5:
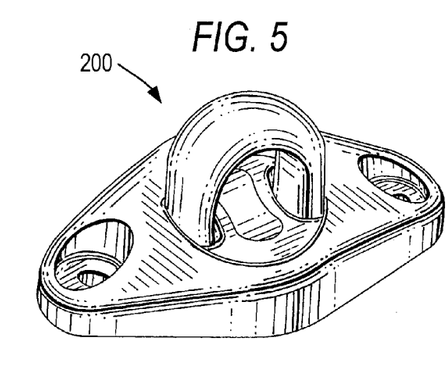
FIG. 5 shows an orthogonal view for a tensioning device.
Figure 6:
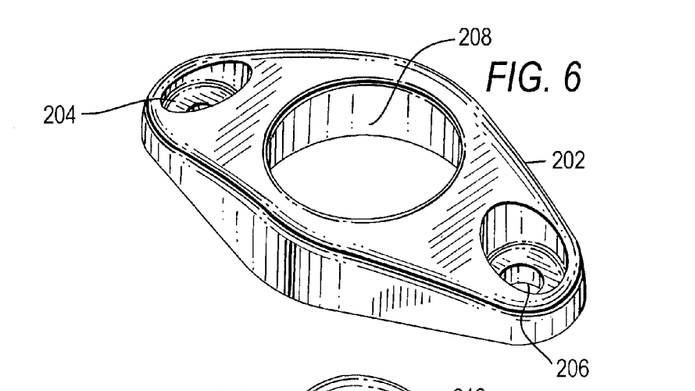
FIG. 6 shows an orthogonal view of the base of the tensioning device of FIG. 5.

FIG. 3 shows another embodiment for the pulleys. In this embodiment, each pulley includes two radial rims 30, 32 like in the embodiment of FIG. 2, the two rims having the same diameter, or one having a larger diameter then the other. In this embodiment, instead of having a continuous surface, the intermediate section between the rims is formed with a plurality of pockets spherical pockets 34A. This embodiment is best suited for a cord 20 made of beads 21, each bid fitting, preferably snugly, within one of the pockets 34A. In this embodiment, the rims 30, 32 may be omitted.

In both embodiments, the pulleys are preferably made of, or are covered with a high friction material such as rubber to insure that the longitudinal movement of cord 20 is translated into rotational movement of pulleys. Moreover, if the pulleys, and in particular pulleys 24A, 24B, are not rotating, friction between the pulleys and the cord prevents the cord 20 from moving longitudinally. In one embodiment, e.g., embodiment of FIG. 2, the pulleys are shaped to pinch or otherwise create an interference fit with the cord 20 so that when the pulleys are free to rotate, longitudinal movement of the cord causes the pulleys to rotate about their respective axes, however if pulleys 24A, 24B are prevented from rotating, the cord interference fit prevents the cord from moving longitudinally.

The device 10 is installed by either mounting it on a wall or attaching it to the window treatment itself, as shown somewhat diagrammatically in FIG. 1. The cord 20 includes a right portion 20A, a left portion 20B and an intermediate portion 20C. The right portion 20B is threaded partially around pulleys 24B and 10B and the intermediate portion 20C is positioned so that it engages a control mechanism 18 of a window treatment. The left portion 20A is trained partially around pulleys 10A and 24A.

Figure 1A:
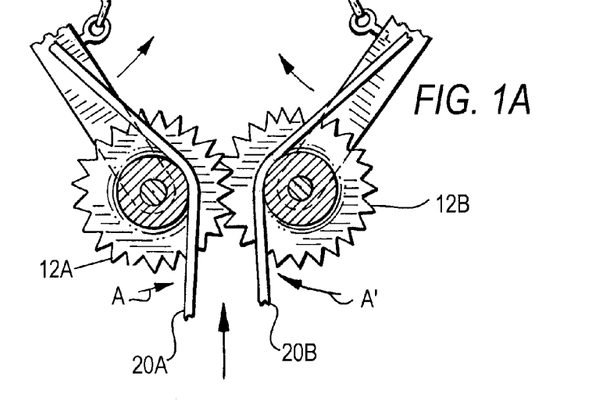
FIG. 1A shows an alternate position for the gears of the device of FIG. 1.

The two sections 20A, 20B then extend down towards a tensioning device 200. Before the cord 20 is tensioned, the cord 20 cannot apply any considerable force on gears 12A, 12B and as a result, these gears are biased toward each other by springs 16A, 16B and their teeth are intermeshed, as shown in FIG. 1A. As previously described, frictional forces prevent cord 20 from moving unless pulleys 24A, 24B are free to rotate about their respective axes. As a result, if either cord segment 20A or cord segment 20B is pulled down, the intermeshed teeth 12A, 12B do not allow the cord 20 to move in either direction and, hence, the window treatment control mechanism 18 cannot be operated. Pulleys 10A, 10B are used to direct the cord 20 into and out of the control mechanism 18.

Tensioning the cord 20 causes the cord segments 20A, 20B to move downward. This causes pulleys 24A, 24B pivot arms 14A, 14B away from each other in directions B, B' and against the forces applied by springs 16A, 16B. This action causes the gears 12A, 12B to separate from each other. The gears 12A, 12B remain separated as long as the cord 20 remains tensioned. With the gears 12A, 12B separated, the pulleys 24A, 24B are free to rotate about their axes and either segment 20A, 20B can be pulled thereby operating mechanism 18 of the window treatment.

Preferably the cord sections 20A, 20B are continuous and form a lower cord loop 20D that is tensioned using the tensioning device 200.

A cord tensioning device 200 that can be suitable for the purposes discussed above is now described. As shown in FIGS. 5-14, preferably cord tensioning device 200 includes a body 202. Body 202 includes two mounting holes 204, 206, that can be used to mount the device 200 on a window seal a side wall or other similar surfaces, and a central hole with an inner cylindrical wall 208. The inner wall is formed with a downwardly oriented lip 209 (see FIG. 11).

Figure 7:
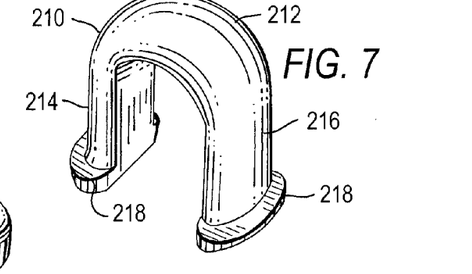
FIG. 7 shows a perspective view of a hasp in the tensioning device of FIG. 5.

Tensioning device 200 further includes a u-shaped hasp 210 having a central curved portion 212 and two parallel leg 214, 216 terminating in respective enlarged portions 218.

Figure 8:
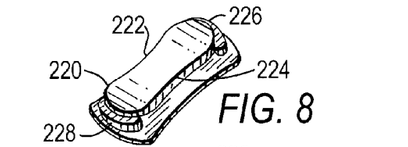
FIG. 8 shows a perspective view of a segment in the tensioning device of FIG. 5.

Tensioning device 200 further includes a segment 220 having two opposed wails 222, 224 that are concave and are sized to contact the inner surfaces of the legs 214, 216. The segment 220 has two further opposite walls 226, 228 having approximately the same curvature as the hole 208 to allow the segment 220 to rotate within the hole.

Figure 9:
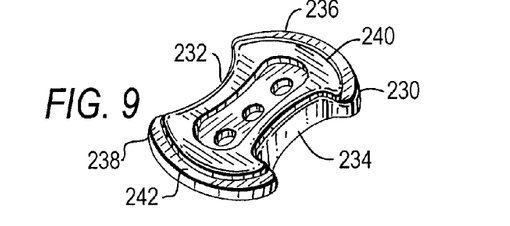
FIG. 9 shows a perspective view of a bottom plate for the tensioning device of FIG. 5.

Tensioning device 200 further includes a bottom plate 230 having two side walls 232, 234 sized and shaped to fit over the enlarged portions 218 and two other sides 236, 238 formed with a respective lip 240, 242.

Figure 10:
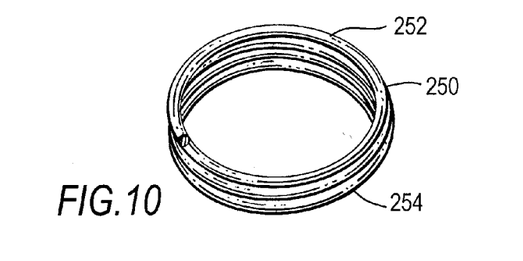
FIG. 10 shows a perspective view of a biasing spring for the tensioning device of FIG. 5.
Figures 11, 13:
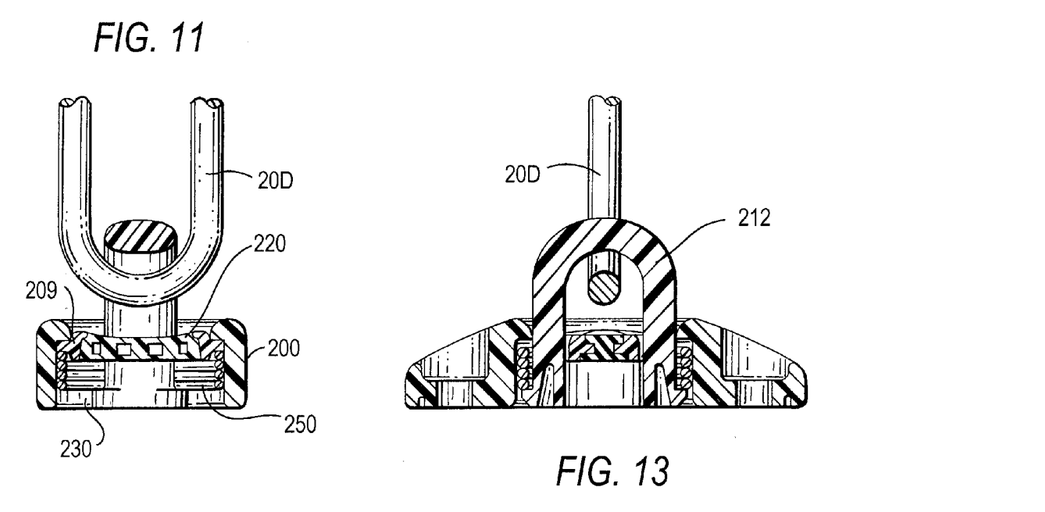
FIG. 11 shows a side view of the tensioning device of FIG. 5 in the installed configuration and receiving the cord 20.
FIG. 13 shows another cross-sectional view of the tensioning device similar to FIG. 11.
Figures 12, 14:
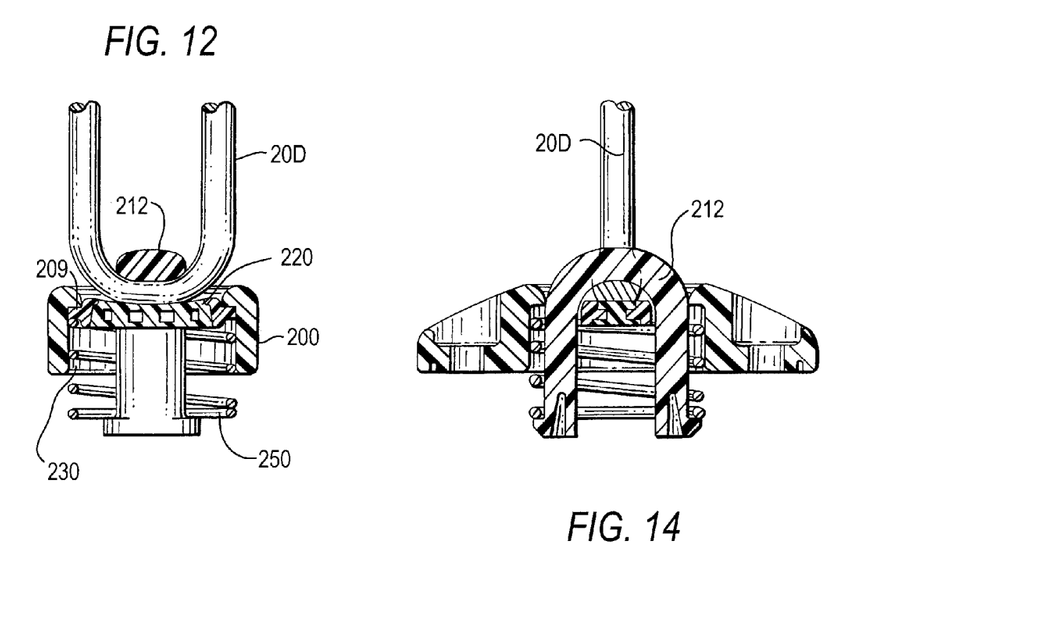
FIG. 12, shows a side view of the tensioning device of FIG. 6 in the closed position.
FIG. 14 shows another cross-sectional view of the tensioning device similar to FIG. 12.

Finally, the tensioning device includes a compression spring 250 with a top 252 and a bottom 254.

The assembled tensioning device is shown in two configurations in FIGS. 11-14. The hasp 210 fits into hole 208 and is axially movable therethrough. The segment 220 and bottom plate 230 are mounted on the hasp between its legs. The compression spring 250 is disposed with its top 252 in contact with lip 209 and its bottom 254 resting on top of plate 230. The force of the spring 250 causes the plate 230 to be positioned downwardly of and away from the bottom of body 202, Importantly the cord portion 20D passes through the hasp 210 and as the hasp is urged downwardly as well, the hasp 210 and the body engage and pinch the cord segment 22C between them and any movement of the cord causes the cord tensioning device 200 to move with the cord.

Once a window treatment is installed (or even before if so desired) the cord tensioning device 200 is attached to any straight surface (a wall, a window sill, etc.) by using screws, nails, etc., through the holes 204, 206. As the cord tensioning device is so installed, its bottom plate 230 is pushed inwardly against the force of spring 250 moving the hasp 210 upwardly at the same time. When the cord tensioning device is fully installed, the hasp 210 is in its final position shown in FIGS. 11, 13. In this configuration, the cord section 20D can move freely through the hasp. The cord is tensioned by the position of the cord tensioning device. Moreover, the cord can be tightened or loosened by rotating the hasp around the axis of hole 208.

Figure 15:
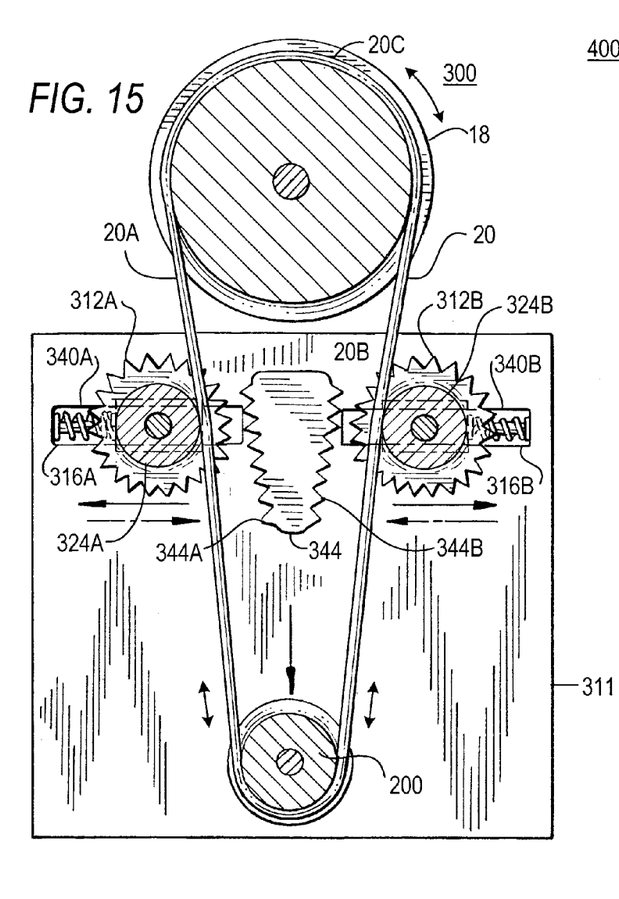
FIG. 15 shows a side view alternate embodiment of the device of FIG. 1.

A device 300 constructed in accordance with an alternate embodiment of the invention is shown in FIG. 15. In this Figure, a window treatment system 300 includes two gears 312A, 312B having gears and being constructed in a manner similar to gears 12A, 128 with the exceptions noted below. The gears 312A, 312B include respective pulleys 324A 3248. The device 300 further includes a base 311 formed with two horizontal slots 340A, 340B. The gears 312A, 312B are rotationally mounted on shafts that are trapped in and slide in respective slots 340A, 340B. Two springs 316A, 316B are used to bias the two gears toward each other. In an alternate embodiment, instead of slots 340A, 340B, arms (not shown) are used that are similar to arms 14A, 14B.

Between the two gears 312a, 312B, there is a central member 344 having two sides 344A, 344B with teeth having the same size as the teeth on gears 312A, 312B. Member 344 is stationary and is attached to base 311.

The cord 20 includes a section 20A at least partially trained around in touch with pulley 340A, a section 20B at least partially trained around, or in touch with pulley 340B. The cord 20 further includes an upper portion 20A trained around a window treatment control mechanism 18, and is tensioned by device 200.

As with the previous embodiments previously discussed, it has been found that it is advantageous to install the system 300 in such a manner that the cord 20 is tensioned. The cord 20 and slots 340A, 340B are arranged so that when the cord 20 is under tension, the teeth of gears 312A, 312B are spaced away from the teeth of member 344 and the gears and their pulleys are free to turn about their respective axes. As a result, the cord 20 can be moved up and down by pulling on 20A, 20B thereby activating the mechanism 18 either in one direction or the other.

However, if the cord 20 is no longer tensioned by device 200, it cannot counteract the forces of springs 316A, 316B. Therefore the springs pull or push the two gears 312A, 312B toward each other until their teeth engage and intermesh with the teeth of sides 344A, 344B respectively, as shown in FIG. 15.

The central member 344 is fixed and cannot move or rotate. Once the gears 312A, 312B come into contact with the teeth of sides 344A, 344B, the gears are immobilized and prevented from rotation by member 344. In this manner the cord 20 is disabled and cannot be used to operate control mechanism 18.

In the embodiments discussed above, means are provided to lock both sides of the cord by training the cord about the pulleys of gears and selectively immobilizing the gears to prevent each side or portion of the cord from moving. In another alternate embodiment, a single gear is provided to immobilize the cord only on one side.

Figure 16:
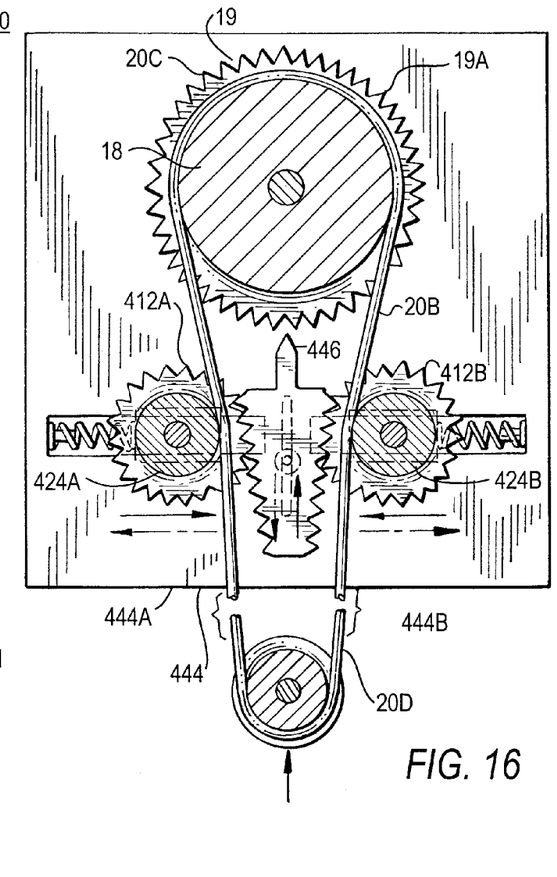
FIG. 16 shows a side view yet another alternate embodiment of the device of FIG. 1.

FIG. 16 shows yet another embodiment similar to the embodiment of FIG. 15. The main difference is that in this embodiment, the central member 444 is not fixed to plate 11 but is slidable vertically and it has at the top a tip 446. Moreover, the control mechanism 18 includes a gear 19 with a plurality of teeth 19A. The central member 444 is arranged so that when cord portion 20B is pulled downward, member 444 moves up until the tip 446 is pushed between two of the teeth 19A and engages the gear 19 so that the gear 19 cannot rotate about its axis. A latch (not shown) interlocks with the member 444 and holds it while the tip 446 engages the teeth 19A. The latch must be reset manually before the device 10 disengages from the gear 19 and allows to rotate about its axis once more.

As with the previous embodiments, device 300 or 400 can be provided separately or can be incorporated into the window treatment.

Numerous modifications may be made to this invention without departing from its scope as defined in the appended claims.

I claim:

1. A device for disabling a window treatment including a control mechanism operated by a cord movable in a longitudinal direction along its length, said device comprising:
    a first member having a cord engaging element, said first member rotating about an axis, said cord engaging element engaging said cord to transfer a motion of said cord along said longitudinal direction into a rotation of said first member, said first member moving laterally with respect to said longitudinal direction between a first and a second position in response to tension on said cord, said first member being in said first position when said cord is not tensioned; and
    a second member;
    said first member and said second member cooperating to block movement of said cord in the longitudinally direction when said first member is in said first position to prevent said cord from operating the window treatment;
    wherein said first member includes a first gear with teeth and said second member has a surface with teeth, said first and said second member having intermeshed teeth when said first member is in said first position, and wherein said teeth are not intermeshed when said first member moves away from said first position.

2. The device of claim 1 wherein said first device is moved away from said first position when tension is applied to said cord.

3. The device of claim 1 wherein said second member is stationary.

4. The device of claim 1 wherein said second member is rotating about an axis.

5. The device of claim 4 wherein said second member is movable laterally with respect to said direction in response to tension on said cord.

6. A device for disabling a window treatment including a control mechanism operated by a cord movable in a longitudinal direction along its length, said device comprising:
    a first member having a cord engaging element, said first member rotating about an axis, said cord engaging element engaging said cord to transfer a motion of said cord along said longitudinal direction into a rotation of said first member, said first member moving laterally with respect to said longitudinal direction between a first and a second position in response to tension on said cord, said first member being in said first position when said cord is not tensioned; and
    a second member;
    said first member and said second member cooperating to block movement of said cord in the longitudinally direction when said first member is in said first position to prevent said cord from operating the window treatment; and wherein said first member includes a first gear having teeth and a pulley attached to said gear, said gear and pulley being interlocked and rotating about a common axis.

7. The device of claim 6 wherein said pulley includes an outer surface, with the cord being partially trained around said outer surface, said outer surface being sized and shaped to form an interference fit with the cord.

8. The device of claim 6 wherein the cord is formed of a plurality of beads interconnected to each other and said outer surface is formed with pockets accepting said beads.

9. A device for disabling a window treatment including a control mechanism operated by a cord movable in a longitudinal direction along its length, said device comprising:
    a first member includes a first member gear with outer teeth and a first member pulley attached to said gear, said pulley and gear rotating about a common axis, said pulley having an outer surface adapted to selectively engage the cord as the cord is trained partially around said outer surface, said outer surface being configured to impede movement of the cord in a direction along the length of the cord if the first member is not rotating; and a second member;

said first member and said second member cooperating to prevent said first member from rotating about said axis when the cord is not tensioned;

wherein said second member is stationary and has one surface with teeth selectively intermeshed with the teeth of the first member.

10. The device of claim 9 wherein said first member is mounted on an arm, said arm pivoting said first member away and toward said first position.

11. The device of claim 10 further comprising a spring biasing said arm toward said first position.

12. The device of claim 9 further comprising a tensioning member selectively tensioning the cord.

13. A device for disabling a window treatment including a control mechanism operated by a cord movable in a longitudinal direction along its length, said device comprising:

a first member having a cord engaging element, said first member rotating about an axis, said cord engaging element engaging said cord to transfer a motion of said cord along said longitudinal direction into a rotation of said first member, said first member moving laterally with respect to said longitudinal direction between a first and a second position in response to tension on said cord; and a second member;

said first member and said second member cooperating to block movement of said cord in the longitudinally direction when said first member is in said first position wherein said first member includes a first gear with teeth and said second member has a surface with teeth, said first and said second member having intermeshed teeth when said first member is in said first position, and wherein said teeth are not intermeshed when said first member moves away from said first position.

14. A device for disabling a window treatment including a control mechanism operated by a cord movable in a longitudinal direction along its length, said device comprising:

a first member having a cord engaging element, said first member rotating about an axis, said cord engaging element engaging said cord to transfer a motion of said cord along said longitudinal direction into a rotation of said first member, said first member moving laterally with respect to said longitudinal direction between a first and a second position in response to tension on said cord; and a second member;

said first member and said second member cooperating to block movement of said cord in the longitudinally direction when said first member is in said first position wherein said first member includes a first gear having teeth and a pulley attached to said gear, said gear and pulley being interlocked and rotating about a common axis.

* * * * *